United States Patent [19]

Wicker et al.

[11] 4,098,136
[45] Jul. 4, 1978

[54] TENSION ROLLER IN THE DRIVE MECHANISM BETWEEN A WEAVING MACHINE AND A DOBBY

[75] Inventors: Walter Wicker, Oeberrieden; Adolf Reisdorf, Horgen, both of Switzerland

[73] Assignee: Stäubli Ltd., Horgen-Zürich, Switzerland

[21] Appl. No.: 803,892

[22] Filed: Jun. 6, 1977

[30] Foreign Application Priority Data

Jun. 11, 1976 [CH] Switzerland .................. 7415/76

[51] Int. Cl.² ............................................. F16H 7/10
[52] U.S. Cl. ............................................. 74/242.15 R
[58] Field of Search ................................ 74/242.15 R

[56] References Cited

U.S. PATENT DOCUMENTS 3,975,965  8/1976  Speer ........................... 74/242.15 R

*Primary Examiner*—Leonard H. Gerin
*Attorney, Agent, or Firm*—Blanchard, Flynn, Thiel, Boutell & Tanis

[57] ABSTRACT

A belt tensioning device having a roller engaging an endless belt supported on at least a pair of guide disks. The axle of the roller is mounted on an adjustment mechanism for effecting a tilting of the axle to facilitate an orientation thereof to keep the belt from moving axially relative to guide disks.

12 Claims, 11 Drawing Figures

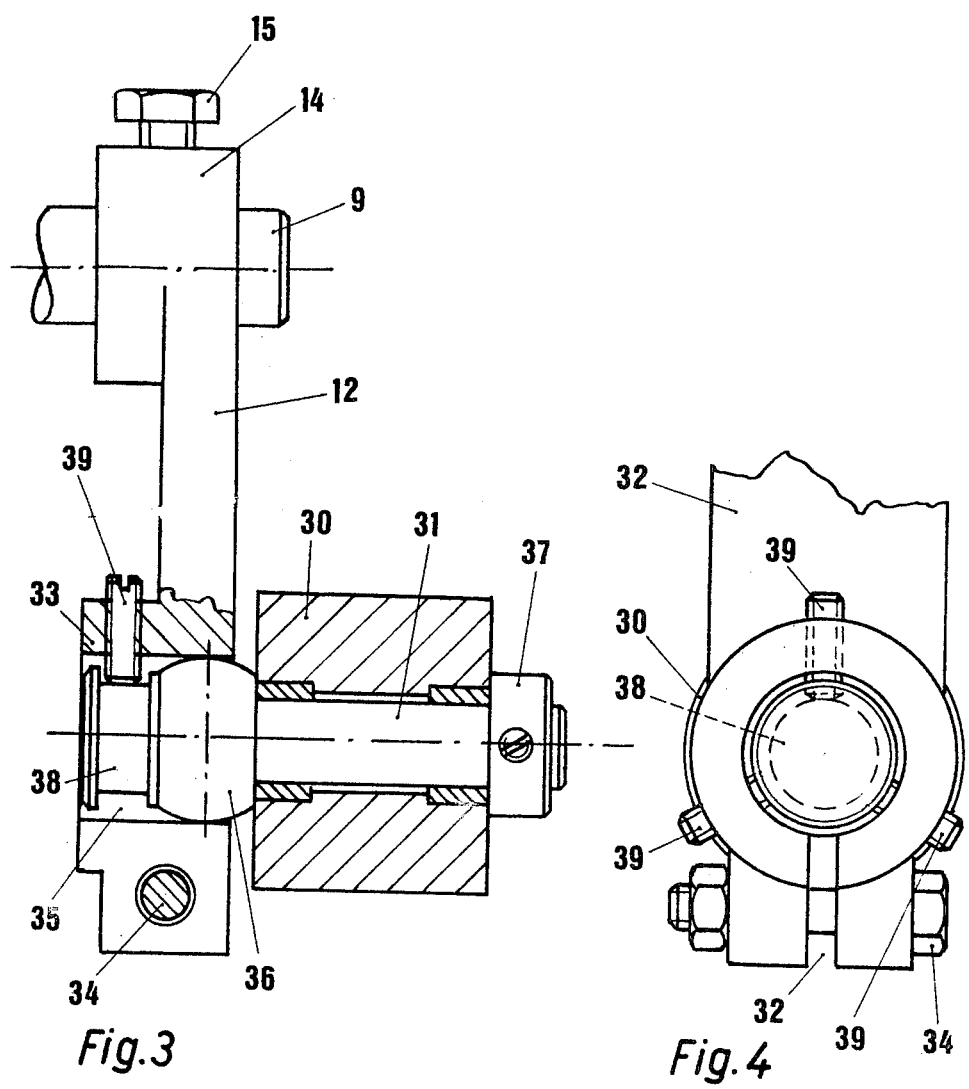

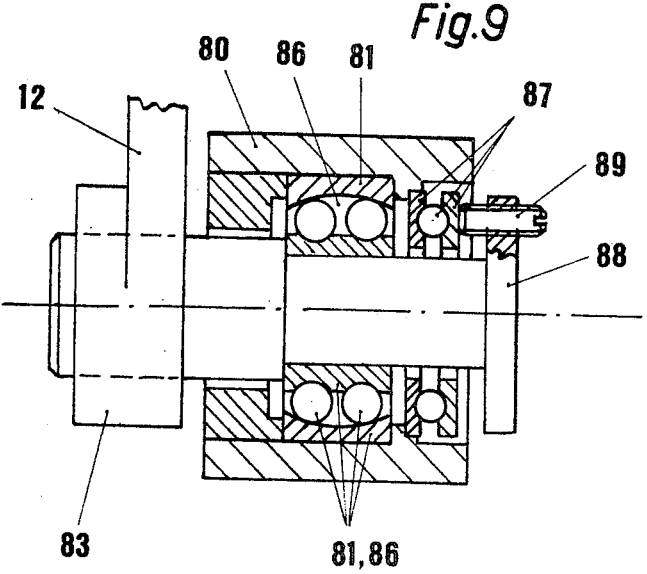
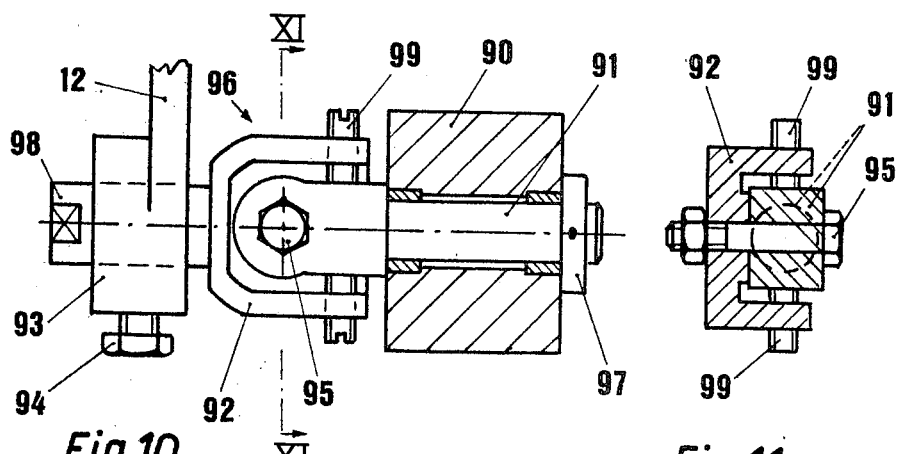

TENSION ROLLER IN THE DRIVE MECHANISM BETWEEN A WEAVING MACHINE AND A DOBBY

FIELD OF THE INVENTION

The invention relates to a tension roller for the belt drive mechanism between a weaving machine and the attached dobby, which tension roller is rotatably supported on an axle, wherein the relative position of the axle can be adjusted and secured with respect to the direction of the belt, preferably during operation, within predetermined limits.

BACKGROUND OF THE INVENTION

Weaving machines and dobbies which control same are built separately, usually by different manufacturers, and are assembled onto one another according to the needs. However, both machines operate synchronously wherein the drive motor of the weaving machine acts simultaneously as a drive for the dobby. The power transmission from the weaving machine onto the dobby is accomplished by means of a continuous belt which extends over disks of the two drive shafts. Great demands with respect to exactness - because of the synchronous mode of operation - and durability during day and night continuous operation are thereby placed on this power transmission.

It is known to use for transmission a chain drive, for example a roller chain. A quieter run, at a considerable reduction in cost, is achieved, however, with the lately used toothed belt, namely an endless leather, rubber, plastic or textile belt which has toothlike strips or ribs on its inside surface. All of these drives have tension rollers to reduce vibrations in the belt or the chain and to counteract a slip danger, which tension rollers consist of a roller which is under spring or weight tension.

While in the case of chain drives the axial parallelism of the shafts and of the tension roller plays rather a subordinate role, in the case of a toothed belt drives a very high exactness must be maintained with respect to this so that the belt does not at all times tend to move axially on the guide disks and result in a premature wear. Moreover, it is not permitted in toothed belt drives, like in flat belts, to use embossed belt disks in order to prevent the belt from drifting laterally.

Great difficulties exist during attachment of the dobbies to weaving machines to maintain an exact axial parallelism of the drive shafts of the two machines. Such inexactnesses lead according to well-known principles to a lateral drifting of the belt. However, one can, within certain limits, overcome the consequences of this error by arranging the axle of the tensioning means sloped with respect to the axes of the belt disks. The sloped position is thereby empirically optimized. Constructions have already been developed which permit an adjustment of the bearing axle of the tension roller in any desired direction. This empirical adjustment, however, demands a lot of experience and a great adjustment work input, this in particular because the known constructions facilitate an adjustment of the tension roller only during standstill. To determine the best position in which the toothed belts have the smallest tendency for axial drifting, the machine must be observed during operation and must be switched off for correction.

The object of the invention is to increase the security of the power-transmitting mechanism and a simplification and reduction in price of the adjustment operations.

This is achieved with a tension roller which is characterized inventively by the axle of the roller being spherically adjustably supported on a pivotal lever and having means for facilitating its adjustment and locking it in place.

The tension roller can with this be adjusted finely and can be locked during the operation of the machines in more than one plane.

BRIEF DESCRIPTION OF THE DRAWINGS

Various exemplary embodiments of the subject matter of the invention are illustrated in the drawings, in which:

FIG. 3 is a side view as viewed in direction III in FIG. 2;

FIG. 4 is an end view of an embodiment of the spherically adjustable support for the tension roller illustrated in FIG. 3;

FIGS. 5 to 9 are cross-sectional views of each of the further embodiments of the support for the tension roller;

FIG. 10 is a partially cut side view; and

FIG. 11 is a cross-sectional view taken along the line XI—XI of FIG. 10 of a still further embodiment of the support for the tension roller.

DETAILED DESCRIPTION

Figure 1:
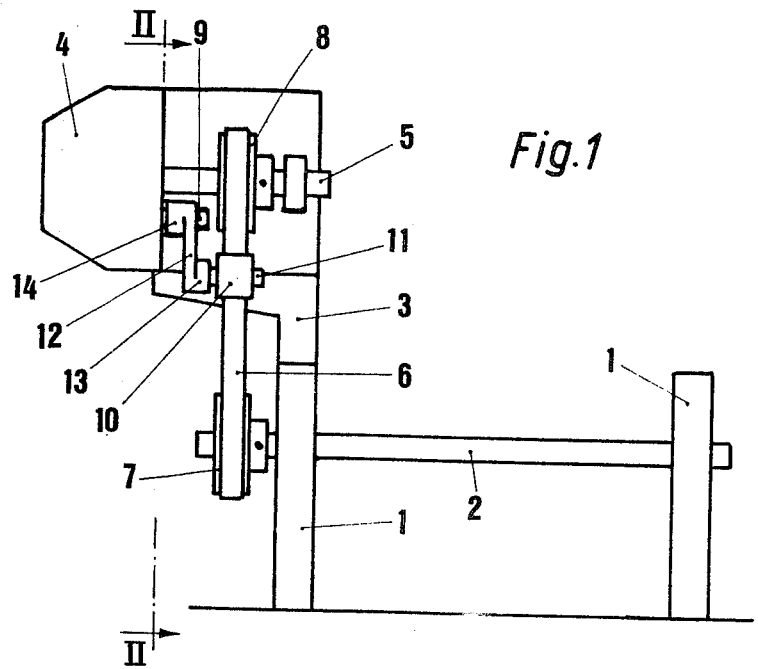
FIG. 1 is a schematic side view of a weaving machine with attached dobby.
Figure 2:
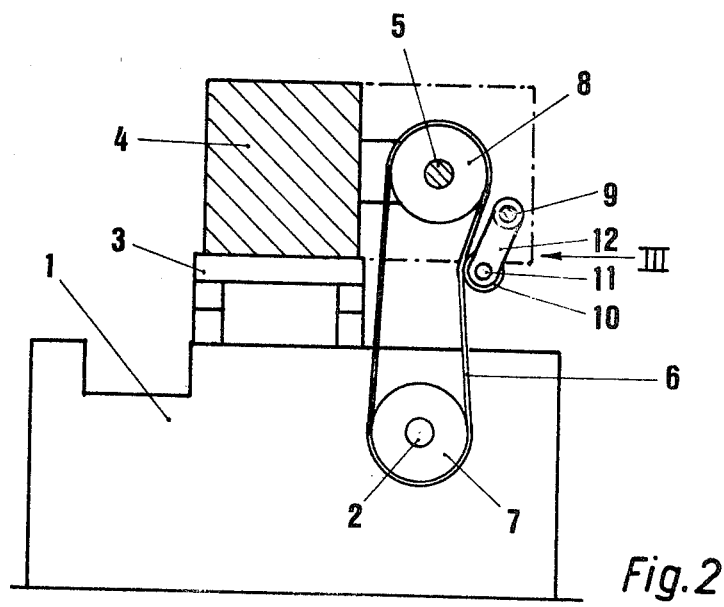
FIG. 2 is a cross-sectional view of the same machine taken along the line II—II of FIG. 1.

The two supporting walls 1 and the drive shaft 2 of the weaving machine are shown in FIG. 1. The dobby or shed-forming machine 4 is mounted on a carrier 3, the drive shaft of said dobby or shed-forming machine being identified with the reference numeral 5. The weaving machine and dobby are positively connected by an endless toothed belt 6, which at the one end is guided over a disk 7 on the shaft 2 of the weaving machine and at the other end over a disk 8 on the shaft 5 of the dobby. To tension the belt 6, a tension roller 10 is used and which is rotatably supported on the axle 11, which in turn is positioned in an end bearing 13 in one end of the lever 12 while the other end of the lever 12 has a bearing 14 thereon which is pivotally supported on a rigid bolt 9 of the dobby 4.

As has already been mentioned, the dobby 4 is attached through the carrier 3 to the frame of the weaving machine. Such an attachment does not assure absolute parallelism of the drive shaft 2 of the weaving machine to the drive shaft 5 of the dobby 4. Small deviations from parallelism exist and these deviations affect the behavior of the drive belt 6 between the two shafts 2, 5.

Some embodiments of a spherically adjustable and securable support for tension rollers will be described more in detail hereinafter with reference to FIGS. 3 to 11.

The pivotal lever 12 is supported on the bolt 9 in FIGS. 3 and 4 and it can be locked to the bolt 9 in a belt tensioning position by means of a screw 15. An end bearing 33 on the pivotal lever 12 remote from the end adjacent the bolt 9 is split open on one side thereof and has a cylindrical bore 35 therethrough into which an axle 31 is fittingly received. The axle 31 has a ball-shaped section 36 defining a spherical part. A tension roller 30 is freely rotatably mounted on the axle 31 and secured in axial direction by a setting ring 37. Regulating screws 39 are positioned around the cylindrical or multi-cornered extension 38 of the axle. In order to adjust the axle 31, the screws 39 which are equally spaced around the axle are alternately loosened or tightened during the running of the belt drive and thus also during the rotation of the tension roller 30, until the toothed belt no longer wanders on the disks 7, 8 (FIG. 1) on the drive shafts 2, 5. To lock the once achieved position, the screw 34 is tightened which affects a narrowing down of the slot 32 and the diameter of the bore 35 is reduced and pressed over the ball-shaped section 36 to hold it in place. A later new adjustment is possible at any time by means of the screws 15, 34 and 39.

Figure 5:
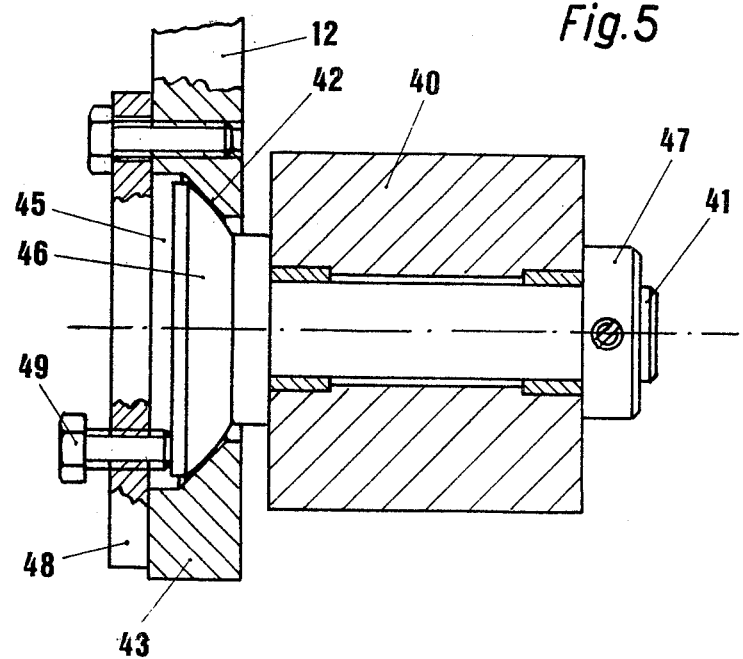

In the embodiment of FIG. 5, the pivotal lever 12 has a bore 45 with a conical section 42. The conical section 42 extends at a angle to the longitudinal axis of the lever 12 and is in touch with a spherically adjustable part, namely an enlargement in the form of a partial arcuate surface 46 on an axle 41 for the tension roller 40. A setting ring 47 is provided to prevent an axial shifting of the roller 40 and is secured to the axle 41. Three regulating or adjusting screws 49 are screwed into a lid 48 on the end of the bearing 43 of the lever 12 and are used for adjusting the partial arcuate surface 46 in the bore 45. If one or the other of the regulating screw 49 is tightened or loosened, then the geometric position of the axle 41 is changed with respect to the lever 12. An even tightening of all three screws against the back part of the partial arcuate surface results in a clamping of the partial arcuate surface 46 in the bore 45.

Figure 6:
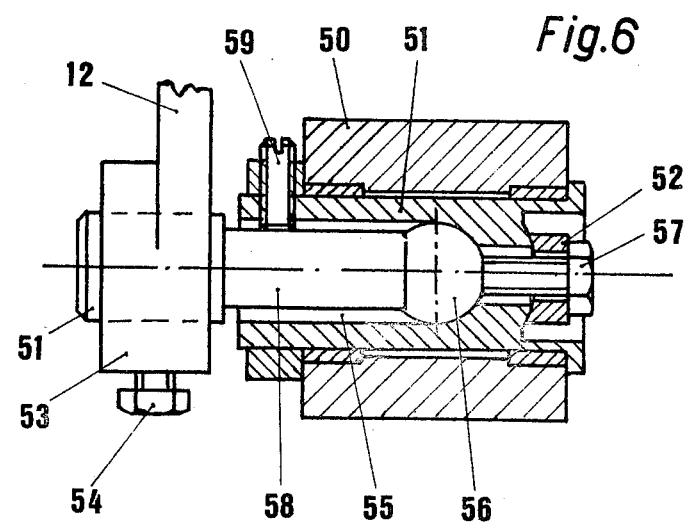

In the embodiment of FIG. 6, the spherically adjustable part is a ball end 56 on a pin 58. A bearing sleeve 51 is arranged radially between a roller 50 and the pin 58. The pin 58 is fixedly supported in the end bearing 53 on the pivotal lever 12 and is fixedly held thereto by means of a screw 54. The bearing sleeve 51 and thus the roller 50 is, due to the play or clearance space 55 between the sleeve 51 and the pin 58, adjustable in its inclination. Adjustment is accomplished by means of regulating screw 59. After adjustment, clamping is achieved by means of a screw 57 which extends axially through a sleeve 52, the arcuately shaped front surface of which presses the bearing sleeve 51 against the head 56 of the pin 58 and the clamping screw 57 is screwed into the ball end or head of the pin 58.

Figure 7:
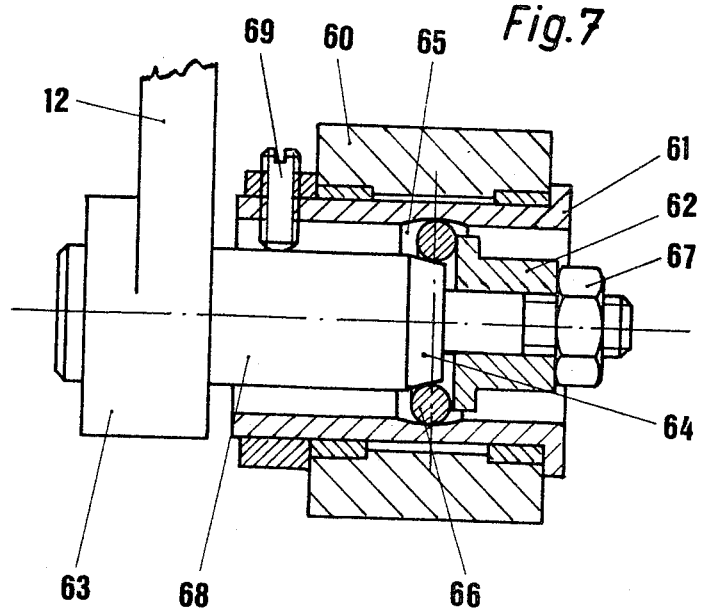

The exemplary embodiment according to FIG. 7 differs from the one according to FIG. 6 in that the ball end is replaced with an elastically deformable ring 66. The roller 60 is freely rotatably supported on a bearing sleeve 61, which in turn can be swung at a small angle with respect to the axis of a pin 68 of the pivotal lever 12, 63. The ring 66 is positioned in a spherically-shaped enlargement 65 in the bearing sleeve 61 and is supported in turn on one side on a conical segment 64 on the pin 68 and on the other side is under the pressure of a clamping screw 67 acting on a sleeve 62. The regulating screws 69 are used to adjust the axial position. By tightening the clamping screw 67, the bearing sleeve 61 is fixedly connected through the ring 66 to the pin 68.

Figure 8:
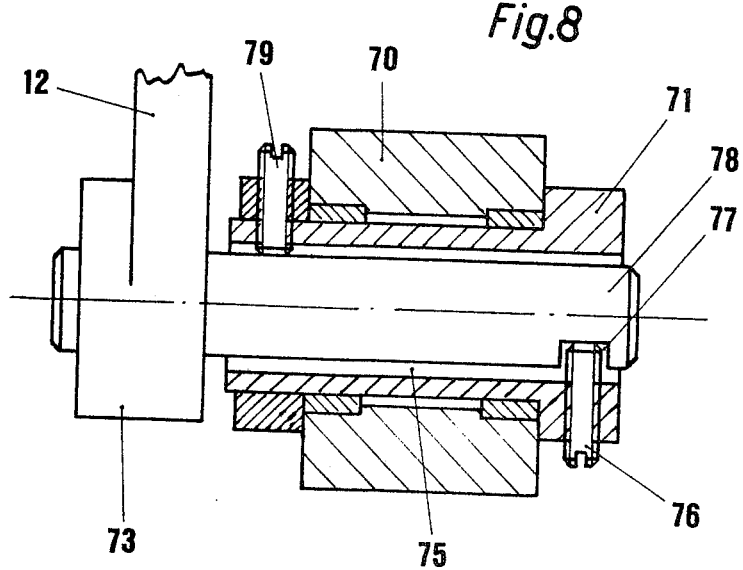

According to FIG. 8, the tension roller 70 is in turn freely rotatably supported in the bearing sleeve 71, which in turn is pivotal to small degree with respect to the axis of a pin 78 for the pivotal lever 12, 73. A clearance space 75 is provided between the bearing sleeve 71 and the pin 78 and the pin 78 is freely floatingly supported at both ends on each one set of preferably three regulating screws 76 and 79. The clearance space 75 may be filled entirely or partly with an elastomer. For a better support of one of the regulating screws 79 and as a securement against rotation and axial shifting, the support 77 for the screw 76 is notched. The axial inclination of the roller 70 or of the bearing sleeve 71 is adjusted by means of the regulating screws 76, 79.

According to FIG. 9, a pin 88 is again inserted in the end bearing 83 of the pivotal lever 12, on which pin rests a spherical ball bearing 81, 86, which supports the tension roller 80. The spherical ball bearing permits the roller to assume within given limits any desired inclined position. This sloped or inclined position can be adjusted and secured by three regulating screws 89 which are arranged on an enlarged front side of the pin 88 wherein the ends of the screws rest on a slide ring or a ball bearing 87.

In the embodiment according to FIGS. 10 and 11, the pin 98 is rotatably supported in an end bearing 93 of the pivotal lever 12 and can be locked in the adjusted position by means of a clamping screw 94. The pin has a U-shaped projection 92 which is closed off on one side with a wall. The bearing axle 91 for the roller 90 is pivotally arranged on this projection through the screw 95 in the plane of the wall wherein the fine adjustment of this pivotal movement occurs by means of the two setscrews 99. Reference numeral 97 identifies the setting ring for the roller 90. The sloped position of the bearing axle 91 and thus of the tension roller 90 occurs on the one side by rotating the pin 98 through the use of its flattened end which projects beyond the end bearing 93 and on the other side by adjusting the regulating screws 99.

In all described exemplary embodiments, the sloped adjustment of the direct bearing element of the tension roller has been described. Of course it is also possible to achieve the same objective by adjusting the bearing of the pivotal lever 12 on the dobby 4 or on the weaving machine 1, 2. It is also conceivable to adjust both parts.

It was not mentioned above, however, but it is to be understood that the tension rollers 10, 13, 40, 50, 60, 70, 80, 90 are supported through ball or slide bearings on the bearing axes 11, 31, 41, 91 or the bearing sleeves 51, 61, 71.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a tension roller for an endless belt for the belt drive mechanism between a weaving machine and an attached dobby, which tension roller is rotatably supported on an axle, wherein the relative position of the axes is adjusted and secured with respect to position and direction of the axes of the driving and driven shaft within predetermined limits, the improvement comprising wherein the axle of the roller is spherically adjustably supported on a pivotal lever and has means for its adjustment and locking.

2. The improved tension roller according to claim 1, wherein the spherically adjustable axle of the roller has a ball-shaped section which is adjustably and clampably supported in a cylindrical bore of the pivotal lever, and that regulating screws extend into the bore and engage the axle.

3. The improved tension roller according to claim 2, wherein the sleeve encircling the bore has a slot therein which can be clamped together by a screw.

4. The improved tension roller according to claim 1, wherein the spherically adjustable axle of the roller has a partial arcuate surface which is adjustably and clampably supported against a conical segment of the bore of the lever and wherein regulating screws of the pivotal lever are directed against the partial arcuate surface.

5. The improved tension roller according to claim 1, wherein the roller is rotatably supported on a bearing sleeve, and the spherical adjustability consists of a ball on a pin, on which rests the bearing sleeve with clearance therebetween, wherein the bearing sleeve has regulating screws which are directed against the pin, and means are arranged, which affect a reciprocal clamping of pin and bearing sleeve.

6. The improved tension roller according to claim 1, wherein the roller is rotatably supported on a bearing sleeve and the spherical adjustability consists of an inner spherical recess of said bearing sleeve, in which an elastically deformable ring is arranged, which is supported on a pin of the pivotal lever, and which is pressed by a screw of the pin, and wherein regulating screws of the bearing sleeve are directed toward the pin.

7. The improved tension roller according to claim 6, wherein the ring is supported on a cone on the pin.

8. The improved tension roller according to claim 1, wherein the roller is rotatably supported on a bearing sleeve, which is supported floatingly through sets of regulating screws which are arranged on both ends of the bearing sleeve as spherical adjusting means.

9. The improved tension roller according to claim 1, wherein the roller rests on a spherical ball bearing, which is on a pin of the pivotal lever, whereby regulating screws of the pin are directed against the movable part of the ball bearing.

10. The improved tension roller according to claim 1, wherein the setscrews are supported on the roller through a further ball bearing.

11. The improved tension roller according to claim 1, wherein a pin is arranged pivotally and securably on the end bearing of the pivotal lever, the end of which is constructed as bearing for the swivel shaft for the bearing axle for the tension roller, and wherein from the end of the pin two regulating screws are directed against the bearing axle.

12. The improved tension roller according to claim 11, wherein the end of the pin, which end is constructed as a bearing, is constructed U-shaped and has a sidewall for the swivel shaft.

* * * * *

UNITED STATES PATENT AND TRADEMARK OFFICE
CERTIFICATE OF CORRECTION

PATENT NO. : 4 098 136
DATED : July 4, 1978
INVENTOR(S) : Walter Wicker et al

It is certified that error appears in the above-identified patent and that said Letters Patent are hereby corrected as shown below:

Column 4, line 59; delete "axes" and replace by

---axis of the axle---.

Signed and Sealed this

Sixth Day of February 1979

[SEAL]

Attest:

RUTH C. MASON
Attesting Officer

DONALD W. BANNER
Commissioner of Patents and Trademarks